UNITED STATES PATENT OFFICE.

ROBERT HADFIELD, OF SHEFFIELD, COUNTY OF YORK, ENGLAND.

STEEL.

SPECIFICATION forming part of Letters Patent No. 342,868, dated June 1, 1886.

Application filed May 7, 1885. Renewed December 8, 1885. Serial No. 185,090. (Specimens.) Patented in England February 17, 1885, No. 2,196.

*To all whom it may concern:*

Be it known that I, ROBERT HADFIELD, a subject of the Queen of Great Britain, residing at Sheffield, in the county of York, England, have invented certain new and useful Improvements in Steel, (for which I have applied for Letters Patent in England, and which application has been accepted and numbered 2,196, and dated February 17, 1885;) and I do hereby declare that the following is a full, clear, and exact description of the invention, which will enable others skilled in the art to which it appertains to make and use the same.

This invention relates to the manufacture of a new and useful metallic alloy or admixture, the principal constituents of which are iron, (Fe,) silicon, (Si,) and carbon, (C,) but which may also contain other ingredients, such as sulphur and phosphorus, as they are necessarily present in the metal. This improved metal is, in fact, steel, with a much larger proportion of silicon (Si) than has heretofore been employed in the manufacture of steel adapted for the purposes of tool-steel, for which purposes my improved steel is specially adapted.

The injurious effect of the presence of sulphur and phosphorus in the cheaper qualities of iron has largely prevented their use in the manufacture of high grades of steel, and has consequently made the cost of production of such steel much greater than if ordinary low grades of iron could be employed. I have discovered, however, that by adding silicon to iron in certain proportions—say above three-fourths of one per cent. of silicon—the same capacity for hardening and tempering is acquired by the iron with which it is incorporated as is given to iron by the addition of carbon only in the ordinary steel-making processes heretofore practiced, with this peculiar advantage, however, in favor of silicon and carbon over carbon only, that the steel made with silicon and carbon instead of carbon only is softer and more easily worked before tempering and becomes harder though less brittle after tempering than carbon steel. I have also discovered that when the silicon is present in sufficient quantity—say three-fourths to one and a half per cent.—I can use as my carbon addition white hematite iron of such a comparatively low grade as is now unfit for steel-making, owing to its high sulphur, consequently the silicon is found to neutralize the injurious effects of sulphur and phosphorus, and I thus obtain a steel giving the same results as the high-class steels made from expensive foreign and other iron substantially free from these ingredients, (sulphur and phosphorus.) This remark also applies to the presence of sulphur and phosphorus in any part of the charge from which my steel is made, the resulting steel product being of very superior quality, although made with comparatively cheap materials. These discoveries I have made use of in the process of making steel described in application for patent filed May 7, 1885, in which silicon is used in the proportion of from one and a half to five per cent. There is, however, another peculiarity in the properties of silicon when mixed with iron, which I have discovered, and which caused me to state one and a half per cent. of silicon as the minimum in my application just referred to, which is, that when iron and silicon are mixed together, the silicon being below one and a half per cent., the alloy thus produced will not harden and temper satisfactorily.

My present invention therefore consists in making an alloy or mixture of iron, silicon, and carbon in the proportions hereinafter set forth, as I have discovered that when the proportion of silicon is below one and a half per cent. in the resulting steel the addition of carbon in the proportion of from about one-fourth of one per cent. to about two and one-half per cent. of carbon in the resulting steel secures the advantages arising from the use of silicon before mentioned, with the capacity of hardening and tempering of ordinary steel.

I am aware, of course, that both silicon and carbon have been present in steel made before my invention; but it has always been considered that silicon and carbon must not, either of them, be high when both are present in steel, and that 0.15 per cent. of silicon has been considered very high for steel which is worked, and one-half of one per cent. very high for steel to be used for castings, so that it has always been regarded as a rule that where silicon was high in the comparative sense just referred to carbon must be low, and vice versa, and that tool-steel and steel required to receive a sharp cutting-edge should be as nearly as possible absolutely free from silicon.

The condition of the iron which forms the basis of my improved steel, and from which it is manufactured, may be that of ordinary pig metal, cast-iron, wrought-iron, steel or iron scrap, or a mixture of any or all of these, and the process or processes by which the iron or steel is manufactured or reduced or subsequently treated is immaterial, the only necessary requirement being that the iron before the introduction of the carbon and silicon additions should be substantially decarburized, by which I mean not necessarily devoid of carbon, but that the metal should be or should have been previously decarburized wholly or to a great extent; hence my improved process is applicable to the manufacture of iron and steel by means of the Bessemer, open-hearth, or crucible processes, those processes being carried on in the usual way as to the first two named until the metal under treatment is nearly or quite decarburized, and then the desired percentages of silicon and carbon are added, while, if the crucible process is employed, the silicon and carbon additions may be introduced at any stage of the process. In the introduction of the silicon addition, however, it must be observed that it is essential that if the Bessemer or open-hearth processes are employed the silicon and carbon additions must be introduced after the iron has been decarburized as completely as it is intended that it should be decarburized, for the reason that in the oxidizing process necessary for decarburizing the charge the silicon present in the charge will be to a great extent oxidized and almost entirely eliminated before the carbon is attacked, so that if the silicon addition were introduced previously to or during the decarburizing operation it would not remain in the charge or be found present in the resulting product.

In practicing my invention the charge may be composed of pig metal, cast-iron, scrap, or a mixture of these with steel or wrought-iron scrap, which are melted, desiliconized, and decarburized in the ordinary way. As before stated, the charge will then be almost entirely free from silicon. When the charge is refined in the open-hearth process, and the blow is finished in the Bessemer process, the carbon and silicon additions are introduced into the charge. The carbon addition consists of hematite pig metal or cast-iron or other carbonaceous iron. The amount of carbon charge will be from four to fifty per cent. of the total charge, according to the percentage of carbon contained in the pig metal used for the carbon addition and the percentage of carbon desired in the resulting product. The silicon addition consists of silicon pig-iron (a well-known product of the blast-furnace process) or other ferro-silicon. The gross amount of silicon addition to be used will also depend on the percentage of silicon which the silicon pig contains and the percentage of silicon which the resulting steel is to contain. The carbon addition and the silicon addition may be introduced either separately or combined, and in pigs or in a broken-up condition, and preferably heated, or, better still, in a melted state. I prefer to use as the silicon addition silicon pig which contains from eight to ten per cent. of silicon, for the reason that such material, being a special product, is more uniform in its quality and constituents, and also because it is low in carbon, which is important, as an unknown amount of carbon in the silicon additions adds an element of uncertainty as to the amount of carbon remaining in the final product. I therefore prefer to add the carbon by means of a separate addition—viz., in the shape of what is hereinbefore described as a "carbon addition." I vary the resulting product between three-fourths and up to one and a half per cent. of silicon, according to the purpose for which the material is to be used; also the amount of carbon in the same way. For example, if a mild form of steel is required—such as chisel-steel—I keep the silicon and carbon at the lower percentages, varying and increasing the proportions as greater hardness is required. After the silicon and carbon additions are incorporated with the charge it is ready to be run into ingots or other forms, as may be desired.

As one example of manufacture, I add to two thousand pounds of decarburized and desiliconized iron six hundred pounds of the silicon pig-iron and two hundred and eighty pounds of the white iron herein referred to; also, if necessary, a sufficient quantity of ferro-manganese; but usually the silicon pig contains sufficient manganese without requiring a separate addition thereof.

Manganese may be added to my improved steel in the usual way and proportions.

If the crucible process is used for the production of my improved steel, the basis of the operation or prime charge being wrought-iron or steel scrap, or both combined, the process is then conducted in the usual way. The carbon addition, together with the silicon addition, is introduced in the crucible with the prime charge or afterward at any stage of the process.

The range of proportions of silicon and carbon contained in the resulting steel which I desire to secure as my invention in this patent is any amount less than one and a half per cent. and not less than three-fourths of one per cent. of silicon, and from one-fourth of one per cent. up to two and one-half per cent. of carbon.

Having thus described my improved steel and the manner in which the same may be manufactured, what I claim as my invention, and desire to secure by Letters Patent, is—

As a new article of manufacture, steel containing, in combination, both carbon and silicon, said ingredients being in the proportions of from one-fourth of one per cent. to two and one-half per cent. of carbon, and from three-fourths of one per cent. up to any amount below one and one-half per cent. of silicon, as hereinbefore described.

ROBERT HADFIELD.

Witnesses:
F. BOWDEN,
S. BOWDEN.